United States Patent [19]

Schricker et al.

[11] Patent Number: 5,566,091
[45] Date of Patent: Oct. 15, 1996

[54] METHOD AND APPARATUS FOR MACHINE HEALTH INFERENCE BY COMPARING TWO LIKE LOADED COMPONENTS

[75] Inventors: David R. Schricker; Rolland D. Scholl, both of Dunlap; Satish M. Shetty, East Peoria; David G. Young, Peoria, all of Ill.

[73] Assignee: Caterpillar Inc., Peoria, Ill.

[21] Appl. No.: 269,474

[22] Filed: Jun. 30, 1994

[51] Int. Cl.[6] ............................................. G08B 21/00
[52] U.S. Cl. ............... 364/551.01; 364/554; 364/424.03; 340/439; 340/679
[58] Field of Search ........................... 364/554, 424.03, 364/424.04, 550, 551.01, 551.02; 340/438, 439, 679; 73/116, 117.2, 117.3

[56] References Cited

U.S. PATENT DOCUMENTS

| | | | |
|---|---|---|---|
| 4,312,044 | 1/1982 | Baba | 364/554 |
| 4,381,549 | 4/1983 | Stamp Jr. et al. | 364/551.01 |
| 4,402,054 | 8/1983 | Osborne et al. | 364/554 |
| 4,613,947 | 9/1986 | Suzuka et al. | 364/554 |
| 4,644,479 | 2/1987 | Kemper et al. | 364/554 |
| 4,796,466 | 1/1989 | Farmer | 364/554 |
| 4,831,539 | 5/1989 | Hagenbuch | 364/424.04 |
| 4,926,331 | 5/1990 | Windle et al. | 340/438 |
| 4,967,381 | 10/1990 | Lane et al. | 364/551.01 |
| 4,980,844 | 12/1990 | Demjanenko et al. | 364/550 |
| 5,018,069 | 5/1991 | Pettigrew | 364/554 |
| 5,060,173 | 10/1991 | Tsuji | 364/554 |
| 5,239,468 | 8/1993 | Sewersky et al. | 364/424.03 |
| 5,293,323 | 3/1994 | Doskocil et al. | 364/554 |
| 5,377,112 | 12/1994 | Brown Jr. et al. | 364/424.03 |

*Primary Examiner*—Ellis B. Ramirez
*Assistant Examiner*—Eric W. Stamber
*Attorney, Agent, or Firm*—Jason J. Young; James R. Yee

[57] ABSTRACT

A method and apparatus are disclosed for monitoring similar machine components loaded in parallel to produce trend information useful in diagnosing and predicting component degradation or failure. The invention is illustrated for engine cylinder exhaust port and manifold temperature measurements. In one embodiment split exhaust manifolds are each provided with a sensor to produce signals indicating the exhaust temperature. A computer-based trending module receives the parallel temperature information, periodically determines a difference between the temperatures, and averages the differential temperature readings over a predefined trend period to generate a trend values. A trend based on a plurality of the trend points is generated and monitored for changes which indicate the possible degradation of one of the measured components. A trap window (trend definition) comprising one or more machine operating parameter levels which must be met to generate a trend value can be used to improve the diagnostic value of the trending. The trap window can be further refined with a trap-lag period allowing the measured components to reach a steady state when a new trap window is entered before trend values are generated. The invention can be used with both stationary and mobile machines, with the data trending and monitoring performed either onboard or remotely from the machine.

33 Claims, 7 Drawing Sheets

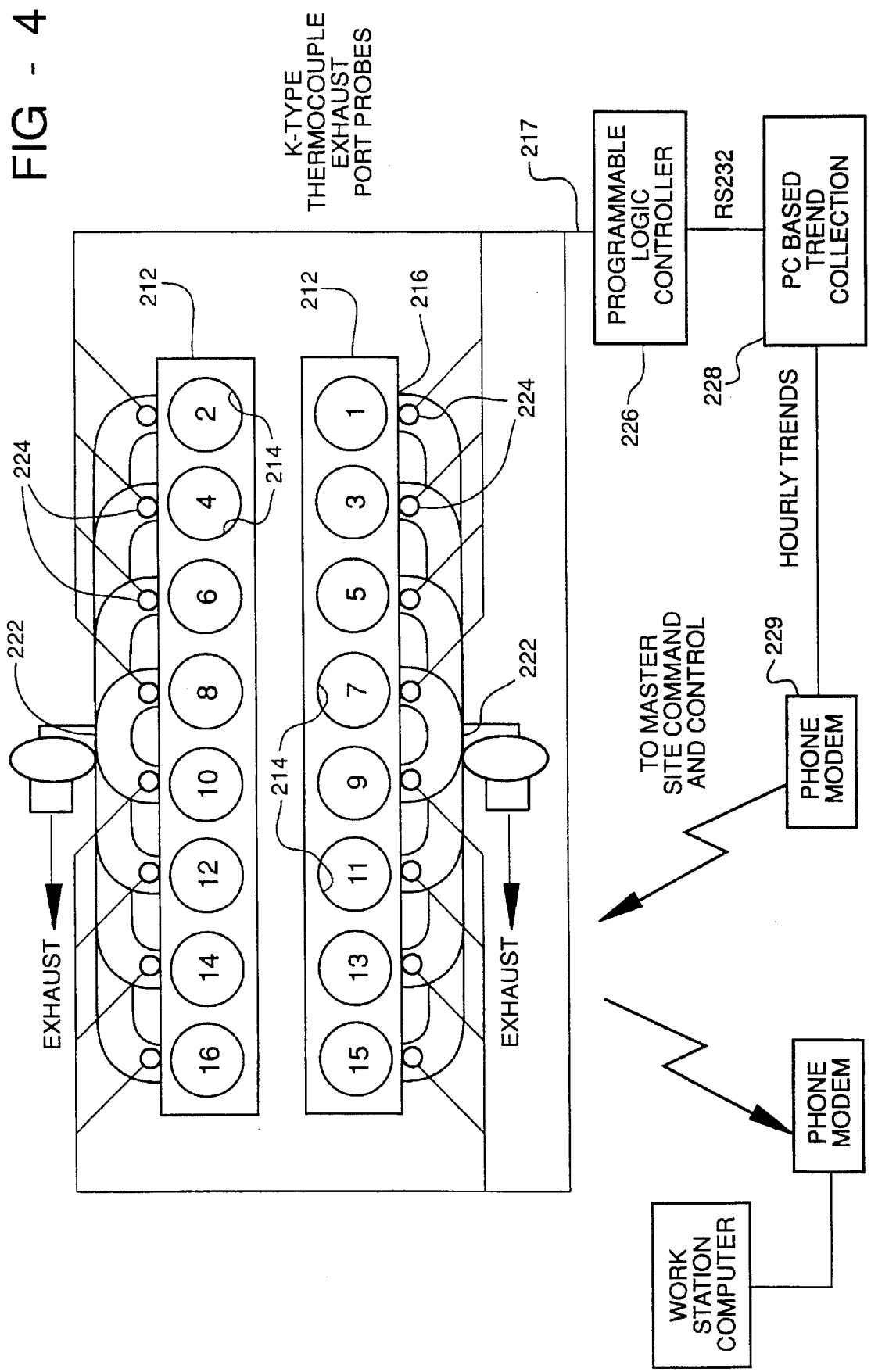

METHOD AND APPARATUS FOR MACHINE HEALTH INFERENCE BY COMPARING TWO LIKE LOADED COMPONENTS

TECHNICAL FIELD

This invention relates generally to a machine diagnostic system and more particularly to a system for selectively processing operating parameter data to provide data useful for diagnosing and predicting component degradation or failure.

In this specification the term "component" refers to any machine component or system with a measurable operating output shared by another such component or system, such that two or more components operating in parallel have parallel outputs.

BACKGROUND ART

For service and diagnostic purposes, machines are sometimes equipped with sensors for measuring operating parameters such as engine RPM, oil pressure, water temperature, boost pressure, oil contamination, electric motor current, hydraulic pressure, system voltage, exhaust manifold temperature and the like. In some cases, storage devices are provided to compile a database for later evaluation of machine performance and to aid in diagnosis. Service personnel examine the accrued data to determine the cause(s) of any failure or to aid in diagnosis. Similarly, service personnel can evaluate the stored data to predict future failures and to correct any problems before an actual failure occurs. Such diagnosis and failure prediction are particularly pertinent to over-the-highway trucks and large work machines such as off-highway mining trucks, hydraulic excavators, track-type tractors, wheel loaders, and the like. Stationary machines such as large stationary engines can also benefit from accurate component diagnosis and failure prediction. These machines represent large capital investments and are capable of substantial productivity when operating properly. It is therefore important to fix or replace degraded components and to predict failures so minor problems can be repaired before they lead to catastrophic failures, and so servicing can be scheduled during periods in which productivity will be least affected.

Systems used in the past often acquire and store data from the machine sensors during different machine operating conditions. For example, some data is acquired while the engine is idling while other data is acquired while the engine is under full load. This poses a problem for service personnel to compare data acquired under such different circumstances and to observe meaningful trends in the sensed parameters.

It is sometimes advantageous to accumulate parameters only when the machine is in a particular operating condition. This type of information is predominantly used during performance evaluation but may also be used in failure diagnosis and prognosis.

To further aid in diagnostics, it is beneficial to package information in such a way that the analysis is simplified as much as possible.

Where a machine includes similar or identical components or systems loaded in parallel during operation, comparisons are sometimes made between two or more of these like-loaded components to diagnose problems or predict failure. One known method is the "hands-on" approach, in which the machine operator or maintenance personnel physically look, listen or feel for differences between the two components during operation. For example, machine operators have been known to feel for temperature differences between cylinder banks or ports looking for causes of poor fuel mileage.

Another known technique for comparing similarly-loaded components is the "drop-out test," in which individual components are selectively turned off to determine which dropped-out component has the least effect on engine or system output.

Other known methods for assessing the comparative performance of various components include the use of chassis dynamometers for measuring the difference between vehicle wheel or drive shaft performance, exhaust pyrometer and cylinder port gages to indicate differences in exhaust manifold or cylinder temperatures, and other non-historical comparison methods and devices. Drawbacks of known component-comparing methods and devices include the subjective nature of many tests; the fact that many tests cannot be performed under actual operating conditions; the lack of historical component-to-component comparison data accumulated during periods of vehicle operation; and difficulty in usefully comparing the data from multiple components such that degradation or failure of one or more of them can be readily determined.

SUMMARY DISCLOSURE OF THE INVENTION

The present invention provides indications of historical operating data for two or more similar machine components operated in parallel. The difference between an operating parameter level of a plurality of parallel components is trended. The information is useful for diagnosing degradation or predicting failure based on the trended difference in performance between the components.

In general, the present invention is achieved with a system for sensing the operating parameters of similar components operated in parallel to produce signals or data indicative of the level of a common operating parameter. Means are provided for determining a difference between the operating parameters of sensed components, and for averaging the difference between them over a trend period. A trend value based on the average of the difference is then generated for that trend period. Trend values are used to generate trends indicating the relative performance of the components.

In a further aspect of the invention, trend values are generated within a trap window or trend definition satisfied when one or more machine operating parameters (e.g. engine speed, rack, coolant temperature) are at desired levels. A plurality of trap windows may be defined so that the components can be compared and trends evaluated under different machine operating conditions.

A trap window may be narrowed to increase the accuracy of the trending by trapping or accumulating component readings after a specified trap-lag period has occurred. The trap-lag period can comprise a period in which one or more machine dependency parameter levels are continuously met.

The method and apparatus of the present invention may be performed and located on the machine on which components are being measured. Preferably, the system includes both on and off-machine operations to increase the flexibility of failure diagnosis and prediction. For example, trend values can be generated on the machine and transmitted to a remote station where trends are generated for diagnostic observation and review.

In general, changes in the difference between component operating parameters as determined by the invention will indicate a problem with one of the components. The trended difference between the components can be checked against predefined limits to generate a warning signal to the operator or diagnostic personnel.

In one embodiment of the invention the difference between two identical components is trended. In another embodiment of the invention the difference between an individual component and the average of a plurality of components is trended. The plurality of components may include the first component.

These and other features of the present invention will become apparent upon further reading of the specification.

BRIEF DESCRIPTION OF THE DRAWINGS

FIG. 4 is a schematic diagram of an engine with individual cylinder exhaust port temperature measurements, and a system according to the present invention for trending the difference between individual cylinders and cylinder bank averages;

BEST MODE FOR CARRYING OUT THE INVENTION

Figure 1:
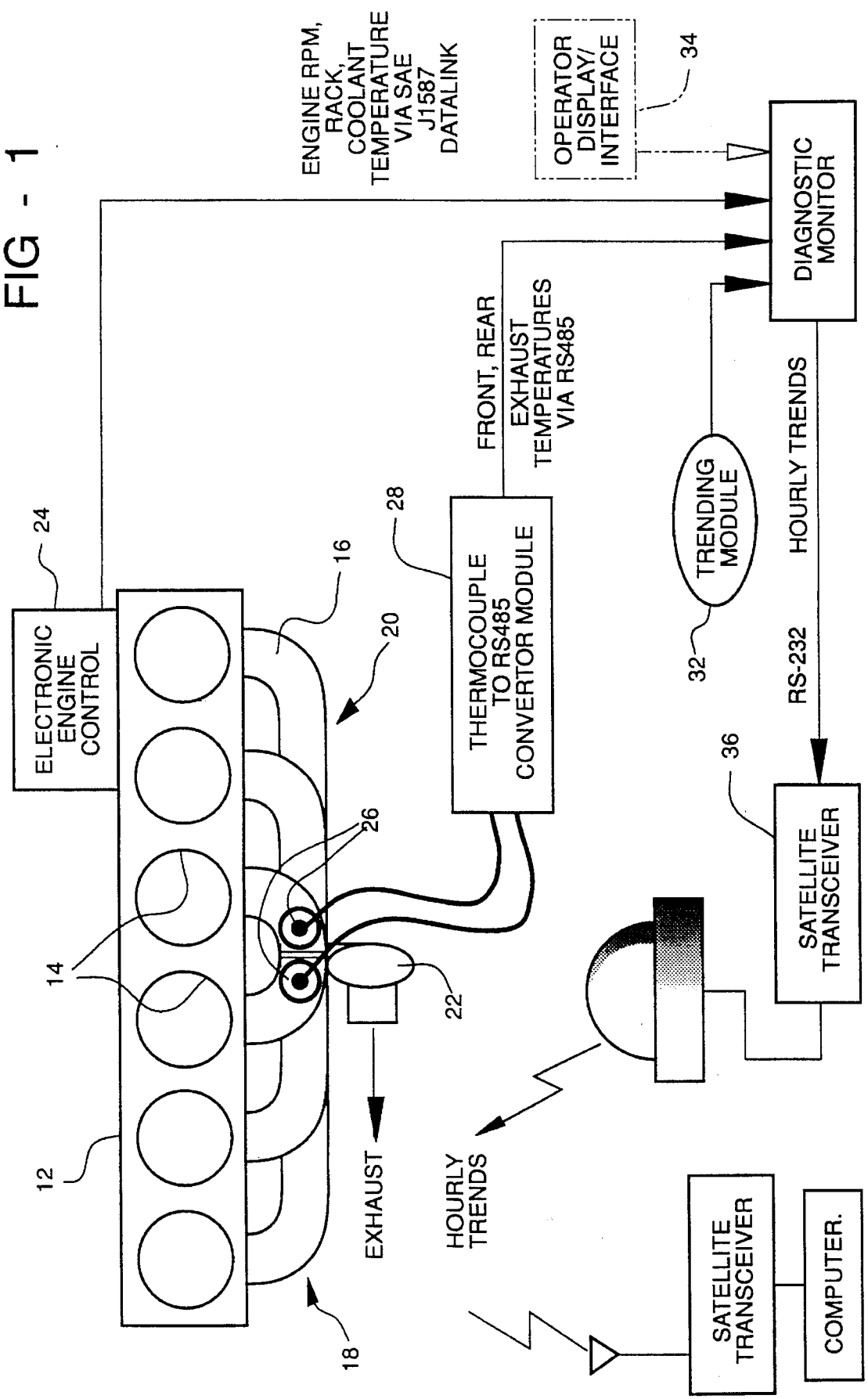
FIG. 1 is a schematic diagram of an engine with a split exhaust manifold, and a system according to the present invention for trending the difference between the split exhaust temperatures to diagnose and predict degradation or failure of components.

Referring to FIG. 1, an exemplary system for carrying out one application of the present invention is shown for a machine engine comprising an engine block 12, a number of cylinders 14 with associated exhaust ports 16, and split exhaust manifolds 18,20 leading to turbocharger turbine inlets at 22. The machine engine is provided with an electronic engine control 24 of known type for monitoring operating parameters such as engine RPM, rack, and coolant temperature. For purpose of illustration the engine 12 represents a six-cylinder diesel engine for over-the-highway trucks, available from Caterpillar, Inc.

Exhaust temperature measurements at each turbocharger turbine inlet from manifold splits 18,20 indicate approximate mean gas temperature from each bank of cylinders. Each manifold split is provided at the turbine inlet with an exhaust temperature probe 26 of known type, for example a thermocouple exhaust probe. The electrical signals from probes 26 are delivered to an RS-485 converter module 28 where the input from thermocouple probes 26 is converted into digital temperature readings.

The system further includes a diagnostic monitor 30, in FIG. 1 onboard the machine with serial port connections to electronic engine control 24 and convertor module 28. In the illustrated embodiment of FIG. 1 diagnostic monitor 30 comprises a main microprocessor and battery-backed working and data memory (two M-Bytes RAM), Flash program memory (256 K-Bytes), a real-time clock chip, and RS-232 ports for telemetry hook-up and programming/user interface. Diagnostic monitor 30 also includes a data input processor and serial ports connected to electronic engine control 24 via SAE J-1708/J-1587 "ATA" data link and to converter module 28 via RS-485 data link.

A software trending module 32 is stored in the memory of diagnostic monitor 30.

Diagnostic monitor 30 receives machine operating information such as engine RPM, rack and coolant temperature from electronic engine control 24. Diagnostic monitor 30 also receives exhaust temperature information for manifold splits 18,20 from converter module 28. Trending module 32 reads and manipulates this information to generate trend information for the sensed component parameters.

Trend information determined by the trending module 32 in diagnostic module 30 is transmitted by RS-232 port connection to a telemetry device 36 and then to a similarly-equipped base workstation computer 37. Telemetry devices 36 can comprise known transmitter or transceiver apparatus such as a two-way radio transceiver or satellite transceiver, for example.

Alternately, or additionally, trend information determined by the trending module in diagnostic monitor 30 may be stored and graphically displayed onboard the machine with a suitable operator display/interface 34.

In the illustrated embodiment, the trend information received by the base computer from transceiver device 36 is stored and translated by the base computer into graphic representations of the component trends, for example on an hourly, daily or weekly basis. Since the historical trends can be monitored by maintenance personnel off the machine, diagnosis can be conveniently scheduled on a periodic basis. Warnings are generated by the off-board computer whenever high or low limits for the exhaust temperature splits are exceeded. Optionally, warnings can be generated onboard the machine by the trending module software in the diagnostic monitor 30 to trigger an alarm at display 34 and relay a diagnostic code via telemetry device 36 to the base station.

In the split exhaust manifold application illustrated in FIG. 1, a change in the average difference between the split exhaust temperatures indicates degradation of a fuel injector, for example. Should one fuel injector fail to deliver fuel, the split of the associated engine bank will be cooler than the temperature measured for the other bank. By comparing the temperature splits and setting both high and low limits on their trended difference, diagnosis of fuel-delivery related problems can be made.

Figure 2:
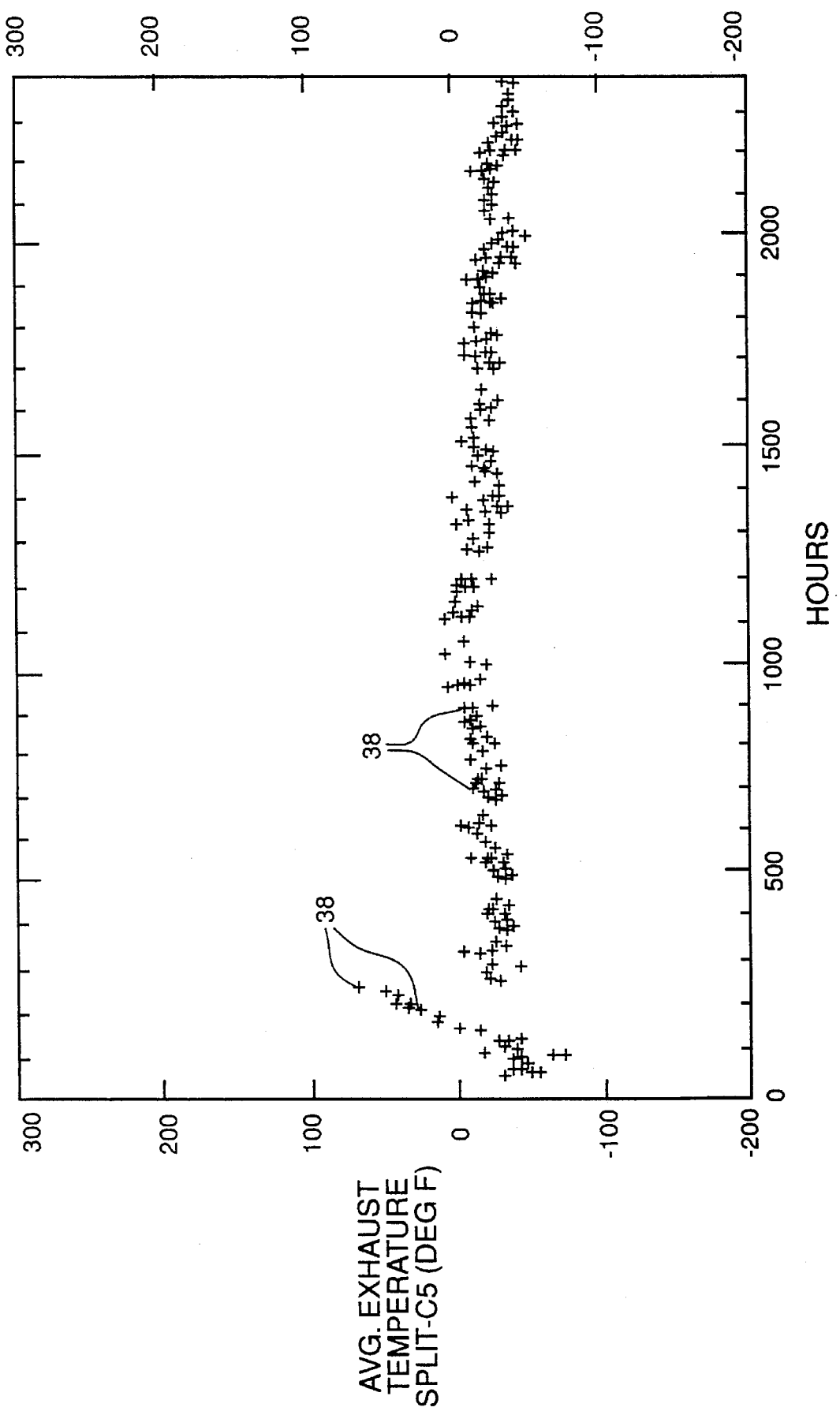
FIG. 2 is a graphical representation of trend data generated by the system of FIG. 1.

Referring now to FIG. 2, a graph illustrates trended data points 38 from the sensed component machine parameter (exhaust temperature). Such displays of historical trend information can be generated by workstation computer 37 and/or the diagnostic monitor 30 on associated printer or video display apparatus from the trend data produced by trending module 32. By viewing the trend of the sensed parameter, component degradation and resulting failure can be identified early by observing, for example, significant increases or decreases in the sensed average temperature split over a period of time. FIG. 2 shows the results of trend analysis for the over-the-highway truck engine of FIG. 1 over 2,380 hours of operation. At approximately 143 hours a noticeable increase in the average exhaust temperature difference can be observed, coinciding with the beginning of degradation of a fuel injector to one of the engine banks. The graph of FIG. 2 shows that the degradation progressively increased, up to the time the faulty fuel injector was replaced at approximately 250 hours. The trend graph then returned to normal for the remainder of the measured period. In the illustrated embodiment, an off-board warning was triggered at approximately 180 engine hours when a predefined limit on the trended difference between the exhaust manifolds was exceeded. The faulty fuel injector could then be diagnosed and monitored until repair/replacement was determined to be convenient or necessary at the 250-hour mark.

Figure 3:
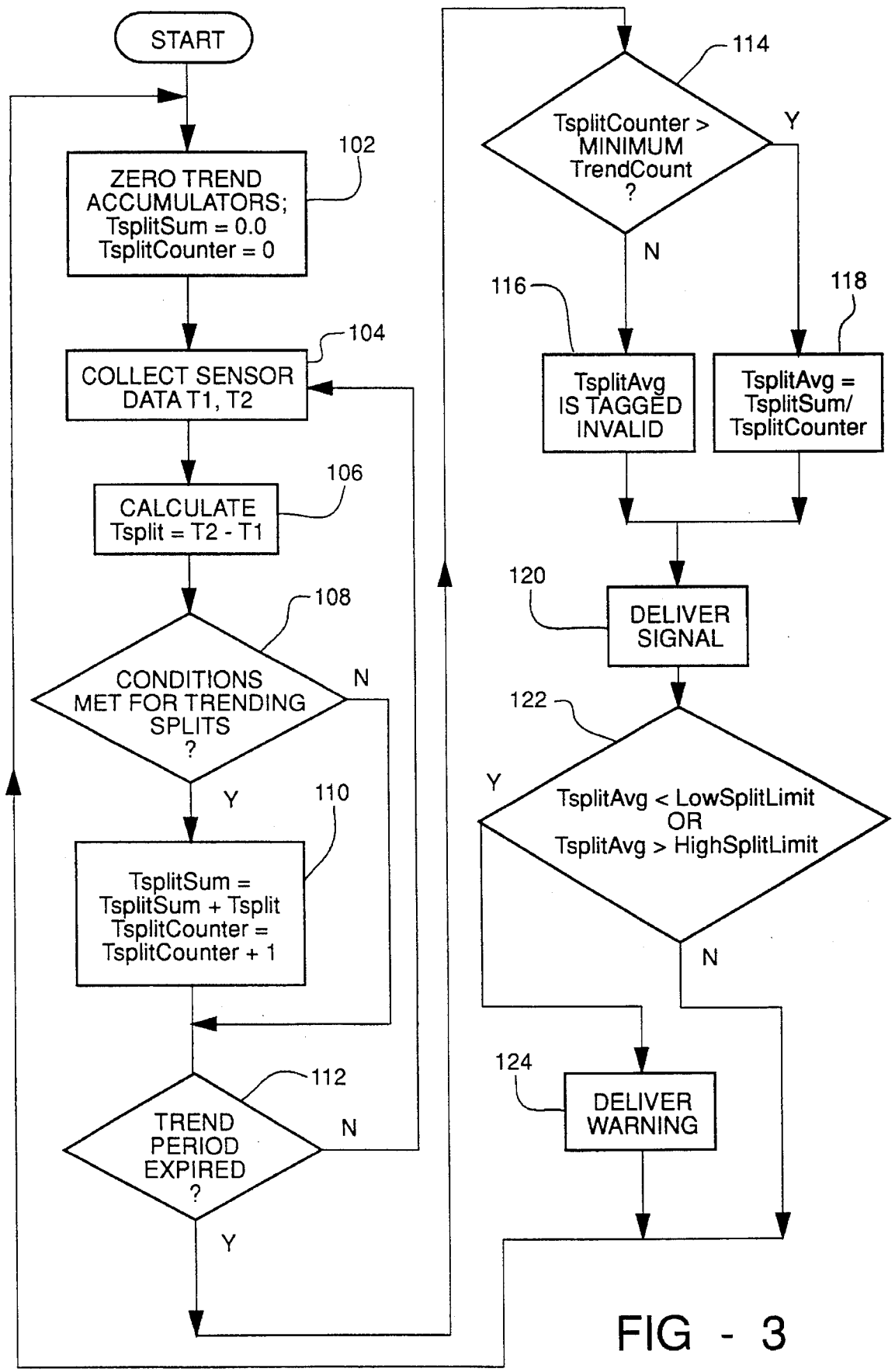
FIGS. 3 and 3A are schematic flowcharts of a method used in the embodiment of FIG. 1 to generate the trend data of FIG. 2.
Figure 3A:
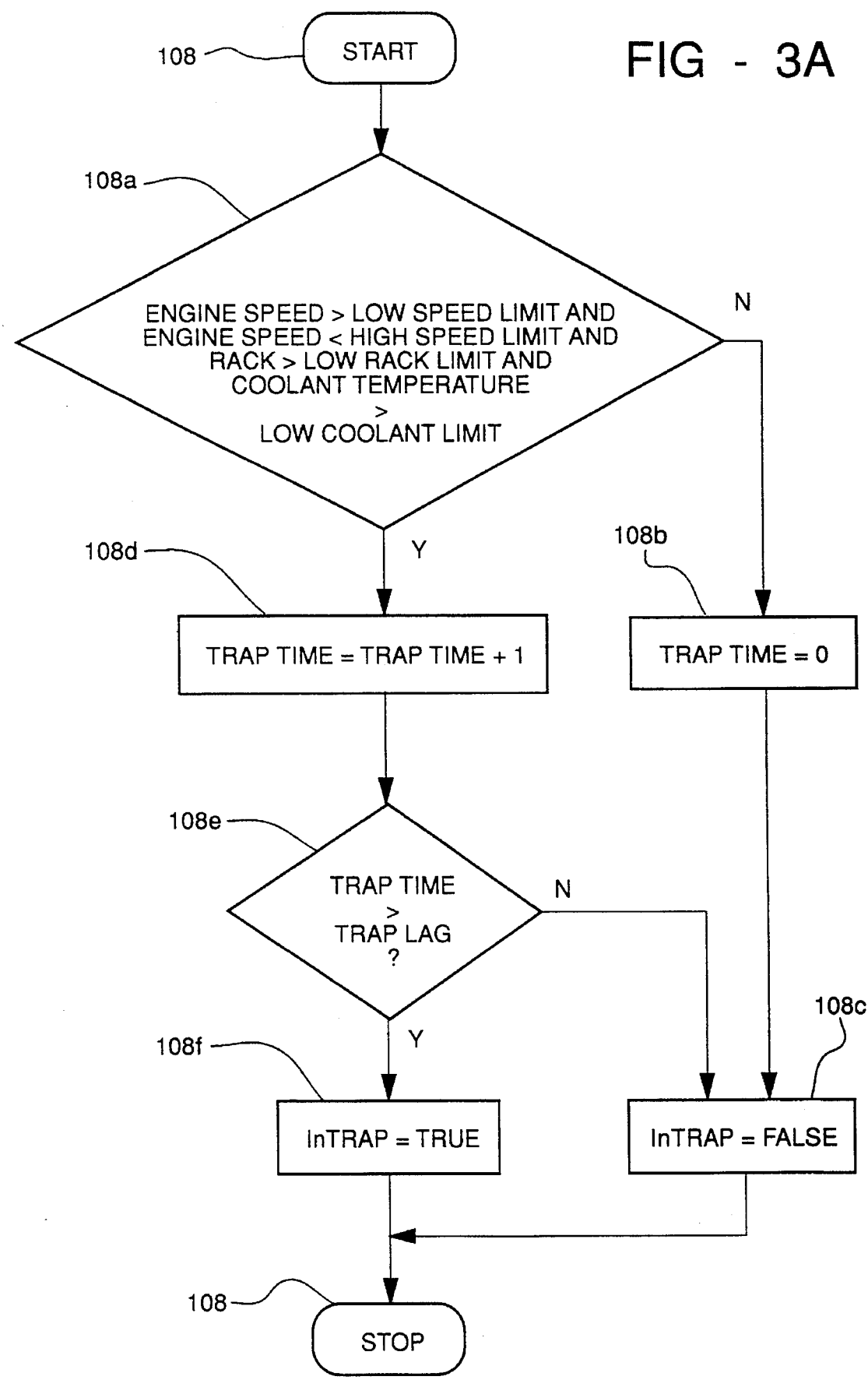

Referring now to FIGS. 3 and 3A, the method employed by the trending module 32 in diagnostic monitor 30 to generate trend information and appropriate warning signals is illustrated in flow chart form.

Each data point plotted on the graph of FIG. 2 is an hourly trend point representing the average temperature difference between the exhaust manifold splits as determined by the system of FIG. 1 over a predefined trend period of one hour. The trend period for which each data point is determined may be measured either in time such as the illustrated period of one hour, or in counts measured in changes in the operating state of the machine or a system or component thereof, for example transmission shifts. A trend period of one hour is used in the illustrated embodiment for ease of explanation.

A subset of machine operating parameters for which trend data is to be produced is also predefined, comprising a trending definition or "trap window" which must be satisfied before trend data is produced. The trending definition or trap window for different sensed parameters will vary, and may be a function of one or more machine operating parameters, sometimes referred to as "dependency" parameters. Trend data is gathered and stored in memory as the specified dependency definition in the trap window is met over a specified trend period. For example, in the illustrated embodiment of FIGS. 1–3, two trending definitions or trap windows are defined by two different combinations of engine rpm, rack and coolant temperature levels or ranges corresponding to idle and loaded operating conditions of the machine. Of course, the machine engine must be running as a prerequisite to the idle and loaded trap windows being satisfied.

Referring still to FIG. 3, the system is initially powered up at step 104, for example automatically when the operator turns the machine on. At step 104 the trending module collects sensor data $T_1$, $T_2$ representing the temperatures of the parallel components (exhaust manifold splits 18,20) as measured by probes 26. At step 106 the difference $T_{split}$ between the exhaust temperatures of the split manifolds is calculated by subtracting $T_1$ from $T_2$. At step 108 the system determines whether the trap window conditions are currently met using the algorithm illustrated in FIG. 3A and described in further detail below. If the trap window conditions have not been satisfied, the system proceeds directly to step 112 to determine whether the trend period, in the illustrated embodiment one hour, has expired. If not, the system returns to step 104 and the loop is repeated.

If the trap window conditions are met at step 108, the system proceeds first to step 110 where the current temperature differential value $T_{split}$ is added to any previous sum of temperature differences $T_{splitsum}$ to "accumulate" or increment the value $T_{splitsum}$. A count of the differential temperature readings accumulated for the current trend period is also incremented at step 110. The system then proceeds to step 112, where, as described above, it determines whether the current trend period of one hour has expired. If not, the loop is again repeated beginning at step 104 with the collection of component sensor data.

The loop of steps 104,106,108,110,112 continues until the trend period has expired, at which point the system proceeds to step 114 to determine whether enough differential temperature readings have been determined and accumulated for that period to provide an adequate basis for a trended data point for that trend period. If the total number of differential temperature readings $T_{splitcounter}$ for the last trend period is less than a minimum defined trend count, the system proceeds to step 116 where the trend point for that trend period is tagged invalid and thereafter ignored by the system. If, however, the minimum trend count is satisfied at step 114, the system proceeds to step 118 where a trended data point $T_{splitavg}$ (the average temperature split for the last trend period) is determined by dividing the sum of the temperature split readings by the total number of counts recorded for the trend period.

At step 120 the system generates and delivers a signal representing the trended data point for the last trend period. This signal is stored and translated by the associated computer apparatus 37 and/or 30 into a plotted trend point on a graph display as shown in FIG. 2. At step 122 the system checks the trended data point $T_{splitavg}$ against predefined high and low temperature split limits to determine whether a warning signal is needed to indicate possible degradation of a measured component. In the illustrated embodiment of FIG. 3, if the trended temperature split for the last trend period is below a minimum limit or above a maximum limit, a warning is generated and delivered at step 124. If the average temperature split at step 122 falls between the high and low limits, no warning signal is generated. After either step 122 or 124, the system next proceeds to step 102 where the accumulated sum of the temperature splits and the differential temperature reading counter are reset to zero. The system then repeats the process for the next trend period.

In the illustrated embodiment of FIG. 1, steps 122 and 124 are performed at base station computer 37 off the machine. Alternately, or additionally, steps 122,124 can be performed onboard the machine by supplementing the diagnostic monitor 30 with suitable software and hardware for comparing the trended data points with predefined limits; displaying the trended data points, for example in graph form as shown in FIG. 2; and generating a warning signal, for example a diagnostic code and/or audiovisual signals such as flashing lights, buzzers or displays.

Referring now to FIG. 3A, the subroutine for determining whether trap window conditions have been met for step 108 in FIG. 3 is illustrated.

In the illustrated embodiment of FIGS. 1–3 for the trending of temperature differences between the split exhaust manifolds of an engine, two trap windows are defined: the first trap window for collecting data when the engine is in a loaded condition; and a second trap window for collecting data when the engine is in an idle condition.

The trap window determination illustrated at step 108a in FIG. 3A is generic to the specific trap windows for loaded and idle conditions. The specific trap windows in the illustrated embodiment for loaded and idle conditions, respectively, are as follows:

When Engine Speed > MIN_LOADCHECK_ENGINE_SPEED and Engine Speed < MAX_LOADCHECK_ENGINE_SPEED and Fuel Demand (Rack) > MIN_LOADCHECK_RACK and Coolant temperature > MIN_LOADCHECK_COOLANT_TEMPERATURE When Engine Speed > MIN_IDLECHECK_ENGINE_SPEED and Engine Speed < MAX_IDLECHECK_ENGINE_SPEED and Fuel Demand (Rack) > MIN_IDLECHECK_RACK and Coolant temperature > MIN_IDLECHECK_COOLANT_TEMPERATURE If the above conditions are met, the trap windows for loaded and idle operating conditions are satisfied and the data is trended. The graph of trended data points in FIG. 2 is drawn from data collected within the loaded and idle trap windows over the 2380 operating hours.

If the appropriate trap window is not met, the system proceeds to step 108b wherein a count of time in which the machine operating parameters have been within the trap window is registered as zero. At step 108c the system tags the temperature split reading as false since the machine is not operating within the trap window. The system then returns to step 108 in FIG. 3 and then to step 112.

If the trap window conditions are satisfied at step 108a, the system proceeds to step 108d where the trap time count is incremented. At step 108e a "trap lag" determination is made to further refine the trending by eliminating potentially false component data readings.

The trap lag is defined as a period during which the current trap window conditions at step 108a have been continuously met. Data from the machine component sensors is ignored for trending purposes until the trap window conditions have been continuously met for the trap lag period. The trap lag time can be set based on experience or other factors to account for machine component hysteresis as machine operating conditions change. For example, when the machine is first turned on the trap window for idle conditions may be satisfied, but the exhaust manifold temperatures will not reach a steady temperature until the machine has properly idled for a minimum period. Data trended before the trap lag period expires may be inaccurate. Likewise, when switching from idle to a loaded operating condition, some amount of time is needed before the exhaust temperatures $T_1$, $T_2$ reach a steady state for the loaded condition. The trap lags in the illustrated embodiment for loaded and idle conditions, respectively, are as follows:

Engine Parameters have been continuously met for LOADCHECK for greater than MIN_LOADCHECK_LAG_TIME seconds Engine Parameters have been continuously met for IDLECHECK for greater than MIN_IDLECHECK_LAG_TIME seconds The trap lag accordingly serves to narrow the trap window to eliminate the effects of component hysteresis as the machine changes operating state or condition, allowing the sensed components to "warm up" before their data is trended. It will be understood that a trap lag can be employed for virtually any set of machine components which are subject to changes of state as the machine is operated.

If the trap time is less than the trap lag at step 108e, the trend data is designated as false at step 108c and the system returns to steps 108 and 112 in FIG. 3. If the trap time is greater than the trap lag, indicating that the components have reached a steady state within the current trap window, the system proceeds to step 108f at which the trend data is designated as true. The system then proceeds to step 110 in FIG. 3 to increment or accumulate the sum of the temperature split values and to generate a trend data point for the current trend period.

It will be apparent to those skilled in the art that the apparatus and method described above for trending the operating temperature of parallel exhaust manifolds can be applied to many types of machine components operated in parallel with common measurable outputs. The presently-illustrated components (exhaust manifolds) and operating parameters (temperature) are but one specific example.

In the illustrated embodiment of FIGS. 1–3, diagnosis/prognosis of component degradation and failure is determined for parallel operating components by trending the average difference between a common operating parameter (temperature). In the alternate and preferred embodiment of FIGS. 4–6, the usefulness of trend information is enhanced by trending an individual component versus the average of multiple components. This method improves the sensitivity of individual component diagnosis.

Referring now to FIG. 4, a further exemplary application of the present invention is illustrated for a stationary generator set engine with cylinder port temperature measurements. In this application the difference between each cylinder port and the average temperature of multiple cylinder ports is trended, representing a preferred method for providing sensitive individual component diagnostics. The generator engine is illustrated comprising two engine banks 212, each having eight cylinders 214 with individual exhaust ports 216. The exhaust ports 216 of engine banks 212 feed into parallel turbocharger turbine inlets 222.

In FIG. 4, the parallel components to be monitored (the cylinders) are equipped for individual exhaust port measurements via thermocouple probes 224 located at each exhaust port 216. Probes 224 in FIG. 4 are K-type thermocouple exhaust port probes of a known type.

The temperature output signal from each exhaust port probe 216 is delivered via communication line or ring 217 to a programmable logic controller (PLC) 226 which monitors and controls the function of the engine and associated generator apparatus (not shown) in known manner. PLC 226 in the present invention is analogous to the electronic engine control and converter module structure in the embodiment of FIG. 1, and provides a convenient apparatus for gathering dependency parameter and component data from the engine and sensors 224 and converting it to digital form. Individual port measurement information is delivered from PLC 226 to personal computer 228 via RS-232 serial link, where trending module software determines hourly trend information from the individual port measurements. The hourly trend information is then delivered via phone modem 229 to a master command and control workstation computer 230 at a base site for generating trends and monitoring the operation of the machine. Alternately, the trending module and generation of hourly trend information can be located and performed offsite at the master workstation computer.

It will be understood by those skilled in the art that the apparatus illustrated in FIG. 4 for receiving, organizing and transmitting information derived from the individual port measurements (226,228,230) could be replaced with the diagnostic monitor and transceiver apparatus of the embodiment of FIG. 1 for a mobile machine application. FIG. 4 illustrates that the apparatus used for measuring and collecting parameter data for the machine components can take alternate forms, depending on the nature of the machine. As in the embodiment of FIG. 1, the apparatus for collecting and trending machine component measurements can be located on or off the machine in various combinations, with communication of data through suitable telemetry devices.

Figure 5:
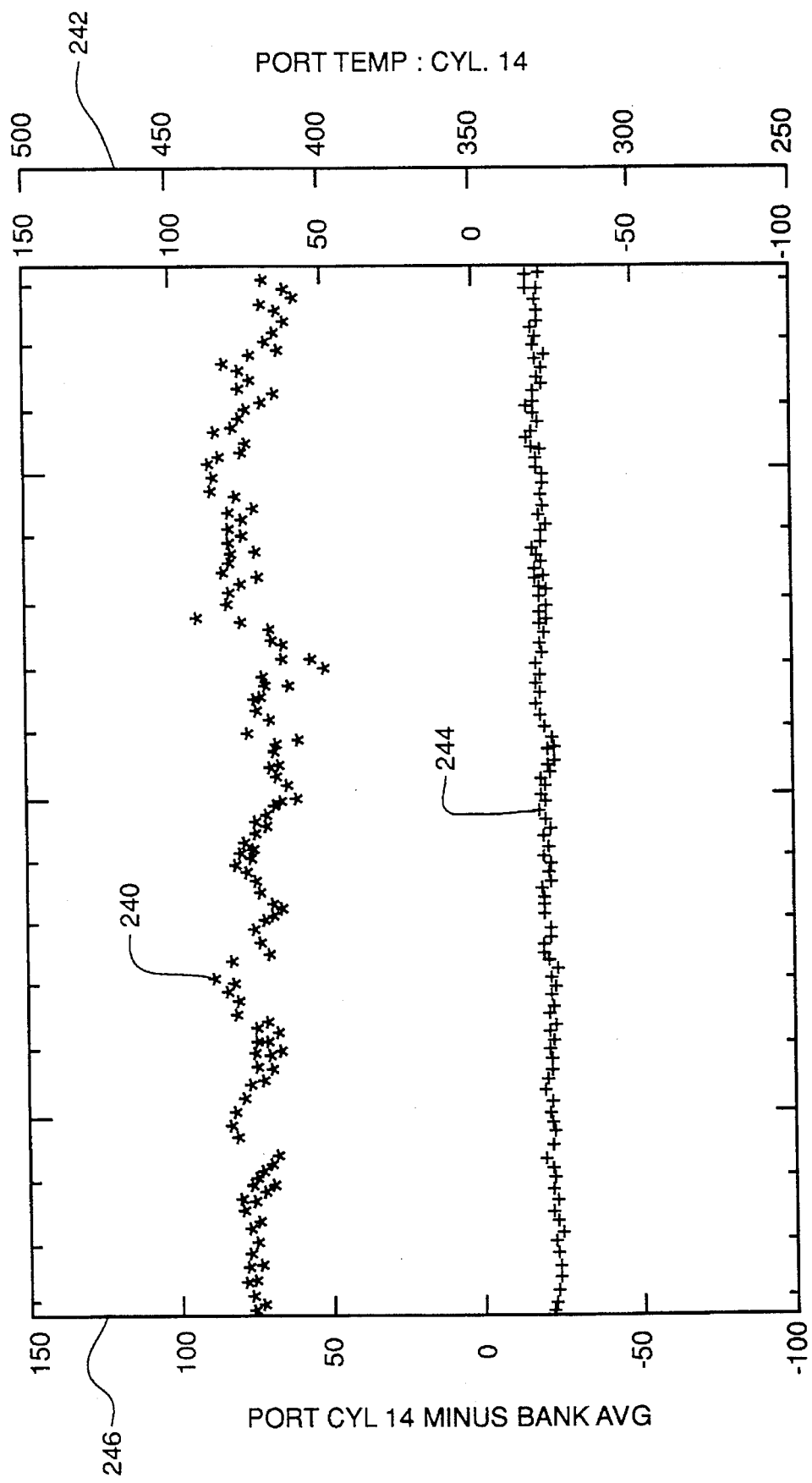
FIG. 5 is a graphical representation of trend data generated by the system of FIG. 4.

Referring now to FIG. 5, a graph illustrates plotted trends for two different trends measured by the system of FIG. 4. Upper trend plot 240 represents hourly measurements of the individual port temperature of a single cylinder (e.g., No. 14), in ° C. corresponding to y-axis scale 242. Lower trend plot 244 represents hourly measurements of the difference between the individual port temperature of cylinder No. 14 and the associated cylinder bank average temperature. The port minus bank average trend points of plot 244 correspond to the inner y-axis scale 246. It should be noted that outer y-axis scale 242 for individual port temperature and inner y-axis scale 246 for port minus bank average temperature represent the same absolute range in ° C., i.e., a 250° C. difference between the bottom and top end of the scales.

The trend plots in FIG. 5 show that trending the port temperature versus bank average temperature removes nearly all of the variation present in the single port temperature trend 240 above it. In the window of time illustrated in FIG. 5 no problems were experienced with port No. 14, and the resulting trend plot 244 is a relatively smooth, uniform line of trend points. However, if the fuel injector for port No. 14 had become plugged, for example, the problem could have been more readily detected from the port minus bank average trend 244 than from the single port temperature trend 240; diagnostically-significant problem variations in the temperature of cylinder port No. 14 are more easily distinguished from the smooth, uniform port minus bank average trend with its built-in reference standard of normal operation.

Figure 6:
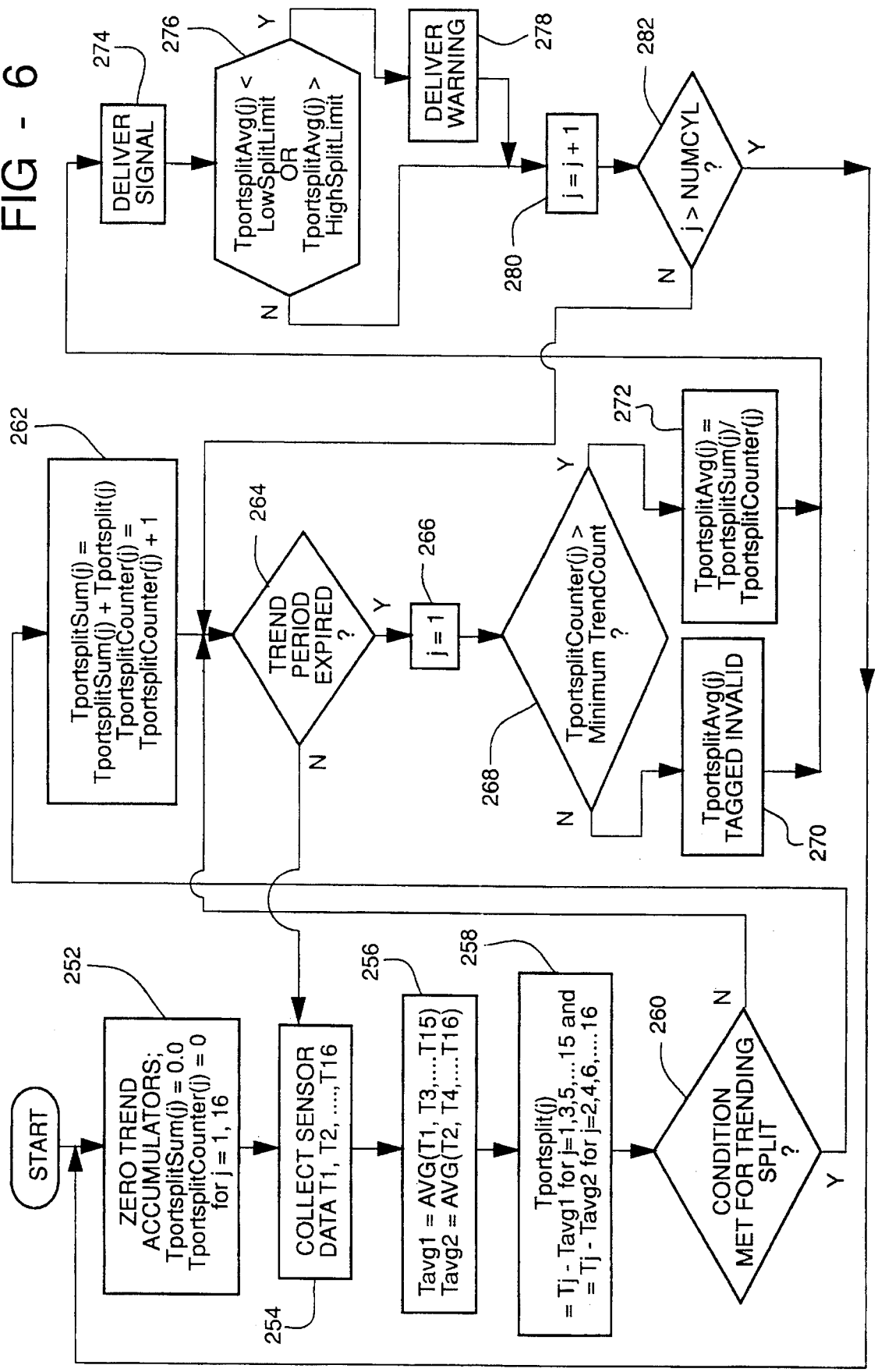
FIG. 6 is a schematic flowchart of a method used in the embodiment of FIG. 4 to generate the trend data of FIG. 5.

Referring now to FIG. 6, a method for trending the port minus bank average measurements is illustrated. It will be understood that, like the method of FIG. 3, the method illustrated in FIG. 6 lends itself to other machine component trending applications, and is not limited to cylinder port or exhaust temperature measurement.

For purpose of illustration the engine is assumed to be running at a fixed rpm except at start-up/shut down. Accordingly, the trending definition or trap window is satisfied when engine speed is greater than the minimum predefined engine speed, or Engine Speed>MIN_CHECK_ENGINE_SPEED At the initial power-up of the system in FIG. 4, sensor data is collected at step 254 for each of the sixteen cylinder ports. In the illustrated port temperature embodiment, the collected data is the temperature of each cylinder port. At step 254 the collected port temperatures are assigned to corresponding system values ($T_1$, $T_2$, ... $T_{16}$) by the PC-based trend collection software in PC 228.

At step 256 the average cylinder port temperature for each bank of cylinders is determined. In the illustrated embodiment the average temperature for the bank of odd-numbered cylinders is the sum of ($T_1$, $T_3$, ... $T_{15}$) divided by eight, while the average for the bank of even-numbered cylinders is the sum of ($T_2$, $T_4$, ... $T_{16}$) divided by eight.

At step 258 the port minus bank average value $T_{portsplit(j)}$ for each cylinder (j) is determined by subtracting the corresponding bank average $T_{avg}$ from the individual port temperature $T_j$.

At step 260 the system determines whether the trap window of machine operating parameters (engine rpm) has been satisfied. This can be determined with the method illustrated in FIG. 3A, using the simplified trap Engine Speed> MIN_CHECK_ENGINE_SPEED at step 108a. If the trap window conditions are met at step 260, the system proceeds to step 262 where the port minus bank average value $T_{portsplit(j)}$ for the current system loop is added to any previous sum $T_{portsplitsum(j)}$ of port minus bank average readings for each cylinder (j). A trend count for each cylinder (j) is also incremented at step 262.

After step 262, or if the trap window conditions are not met at step 260, the system proceeds to step 264 to determine whether the current trend period, for example one hour, has expired. If no, the system returns to step 254 and the loop is repeated to generate the next set of data points for the cylinders in the system. If the trend period is determined to have expired at step 264, the system proceeds first to step 266 where the cylinder value (j) is reset to 1, and then to step 268 where the counter for cylinder (j) is compared to a trend count predetermined by the user to be the minimum necessary to have determined an accurate average port minus bank average value $T_{portsplitavg(j)}$. If the minimum trend count is not met at step 268, the system proceeds to step 270 where $T_{portsplitavg(j)}$ is tagged invalid and ignored by the system. If the minimum trend count is satisfied at step 268, the system proceeds to step 272 where an average value for the port minus bank average difference is determined by dividing the sum of the individual port minus bank average data points by the associated count.

The system then proceeds to step 274 where a signal representing the average value for the port minus bank average for cylinder (j) is generated. This signal is stored and translated by the associated computer apparatus 230 and/or 228 (FIG. 4) into a plotted trend point on a graph display as shown in FIG. 5. At step 276 the system checks that trend value against predefined high and low limits. If the trend point is determined to be above or below the high or low limits, a warning signal is generated and delivered at step 278. If not, the system proceeds to step 280 where the cylinder being monitored is incremented to the next cylinder. If at step 282 the incremented cylinder value is greater than the total number of cylinders, here sixteen cylinders, the system returns to step 252 where the trend accumulators are reset to zero to begin the next trend period. If at step 282 the current cylinder number is not greater than the total number of cylinders, the system returns to step 268 to trend the next cylinder in the system.

Industrial Applicability

It will be apparent from the foregoing that the method of trending parallel components can be applied to many different types of parallel loaded components operating in a machine system. By trending historical operating parameter data for components loaded in parallel as illustrated above, variations in component performance indicating possible degradation or failure can be more accurately diagnosed than by looking at individual component trends alone. This increases the likelihood of early problem diagnosis, such that repairs can be made before a component fails or has a significant negative effect on machine performance. It also facilitates the convenient scheduling of component replacement or repair around machine operation.

The choice of parameter(s) measured, trap window conditions and definitions, the length of the trend period, the number of components measured, averaged and compared, the types of sensors, and the associated apparatus for receiving the component data and trending that information can vary. The foregoing illustrative embodiments of methods and apparatus for carrying out the present invention are therefore not to be construed as limiting the invention beyond the scope of the appended claims.

We claim:

1. A method for diagnosing degradation and predicting failure of similar machine components operated in parallel, comprising the following steps:

providing a plurality of similar components with sensor means for producing signals indicative of a level of an operating parameter common to the components;

periodically determining from said signals a difference between the operating parameter level of a first component and the operating parameter level of a second component to generate a differential value;

averaging one or more differential values over a predefined trend period to generate a corresponding trend value for that period; and generating a trend based on a plurality of trend values to provide an indication of component performance useful in diagnosing component health.

2. Method as defined in claim 1, further including the steps of defining a trap window comprising one or more machine dependency parameter levels, and generating a trend value based on one or more differential values generated within the trap window.

3. Method as defined in claim 2, further including the step of defining a plurality of trap windows corresponding to different machine operating conditions and generating a trend value based on one or more differential values generated within the trap windows.

4. A method as defined in claim 2, further including the step of defining a trap-lag period within the trap window, and generating a trend value based on one or more differential values generated within the trap window after the trap-lag period has occurred.

5. A method as defined in claim 4, wherein the trap-lag period comprises a period in which the one or more machine dependency parameter levels are continuously met.

6. A method as defined in claim 1, wherein the machine is mobile and the step of generating a trend is performed by means located onboard the machine.

7. A method as defined in claim 1, wherein the machine is mobile, the step of generating trend values is performed by means located on the machine and the trend values are transmitted off the machine, and the step of generating a trend is performed by means located off the machine.

8. A method as defined in claim 1, further including the step of comparing the trend value against a predefined limit.

9. A method as defined in claim 8, further including the step of generating a warning signal when a trend value is beyond the predefined limit.

10. A method as defined in claim 1, wherein the step of periodically determining the difference between the operating parameter levels of the first component and the second component further comprises the step of determining the difference between the operating parameter level of two identical components.

11. A method as defined in claim 1, wherein the step of periodically determining the difference between the operating parameter level of the first component and the second component further comprises the step of determining the difference between the operating parameter level of a first individual component and an average operating parameter level of a plurality of components.

12. A method as defined in claim 11, wherein the plurality of components includes the first component.

13. An apparatus for diagnosing degradation and predicting failure of similar machine components operated in parallel, comprising:

a plurality of sensor means for producing signals indicative of a level of an operating parameter common to a plurality of the similar components;

means for receiving said signals and for determining a difference between the operating parameter level of a first component and the operating parameter level of at least a second component to generate a differential value;

means for averaging one or more differential values over a predefined trend period to generate a corresponding trend value for that period; and means for generating a trend based on one or more trend values to provide an indication of component performance useful in diagnosing component health.

14. An apparatus as defined in claim 13, further including trap window means comprising one or more machine dependency parameter levels and means for producing signals indicative of a level of the trap window machine dependency parameters, the trend values being based on one or more differential values generated within the trap window means.

15. An apparatus as defined in claim 14, further including means for defining a plurality of trap windows corresponding to different machine operating conditions and for generating trend values based on differential values generated in the trap windows.

16. An apparatus as defined in claim 14, further including means for defining a trap-lag period within a trap window, and generating a trend value based on one or more differential values generated in the trap window after the trap-lag period has occurred.

17. An apparatus as defined in claim 16, wherein the trap-lag period comprises a period in which the one or more machine dependency parameter levels are continuously met.

18. An apparatus as defined in claim 13, wherein the machine is mobile and the means for generating a trend are located onboard the machine.

19. An apparatus as defined in claim 13, wherein the machine is mobile, the means for generating trend values are located onboard the machine, and the means for generating a trend are located off the machine, further including means for transmitting the trend values to the means for generating a trend.

20. An apparatus as defined in claim 13, further including means for checking trend values against a predefined limit.

21. An apparatus as defined in claim 20, further including means for generating a warning signal when a trend value is beyond the predefined limit.

22. An apparatus as defined in claim 13, wherein the first component and the second component are identical components.

23. An apparatus as defined in claim 13, wherein the first component is an individual component, the second component comprises a plurality of components, and each differential value comprises the difference between the operating parameter level of the first component and an average operating parameter level of the plurality of components.

24. An apparatus as defined in claim 23, wherein the plurality of components includes the first component.

25. A method for providing historical trend data regarding operating parameters of similar machine components operated in parallel, comprising the following steps:

providing a plurality of parallel components with sensor means for producing signals indicative of a level of an operating parameter common to the similar components;

determining from said signals a difference between the operating parameter level of a first component and the operating parameter level of a second component;

averaging the difference over a trend period to generate a corresponding trend value for that period; and generating a trend based on one or more trend values indicative of relative performance of the components over time.

26. A method as defined in claim 25, wherein the step of determining the difference between the operating parameter levels of the first component and the second component further comprises the step of determining the difference between the operating parameter level of two identical components.

27. A method as defined in claim 25, wherein the step of determining the difference between the operating parameter levels of the first component and the second component further comprises the step of determining the difference between the operating parameter level of a first individual component and an average operating parameter level of a plurality of components.

28. An apparatus for providing historical trend data regarding operating parameters of similar machine components operating in parallel, comprising:

a plurality of component sensor means for producing signals indicative of a level of an operating parameter common to the similar components;

means for receiving said signals and for determining a difference between the operating parameter level of a first component and the operating parameter level of a second component;

means for averaging the difference over a trend period to generate a corresponding trend value for that period; and means for generating a trend based on one or more trend values indicative of relative performance of the components over time.

29. An apparatus as defined in claim 28, wherein the first component and the second component are identical components.

30. An apparatus as defined in claim 28, wherein the first component is an individual component, the second component comprises a plurality of components, and the difference comprises a difference between the operating parameter level of the first component and an average operating parameter level of the plurality of components.

31. A method for providing historical trend data regarding operating parameters of similar machine components operated in parallel, comprising the following steps:

providing a plurality of the similar components with sensor means for producing signals indicative of a level of an operating parameter common to the components; and trending a difference between the operating parameter level of a first component and a second component to disclose trends indicative of the relative performance of the similar components over time.

32. An apparatus for providing historical trend data regarding operating parameters of similar machine components operated in parallel, comprising:

a plurality of component sensor means for producing signals indicative of a level of an operating parameter common to the similar components; and means for trending a difference between the operating parameter level of a first component and a second component to disclose trends indicative of relative performance of the similar components over time.

33. A method for providing historical data regarding machine operating parameters of similar machine components operated in parallel, comprising the steps of:

producing signals indicative of a level of similar machine operating parameters, said similar machine operating parameters including a first operating parameter and one or more dependency parameters;

selecting data representative of said first operating parameter in response to a dependency definition being satisfied, said dependency definition including a predefined range for each of said dependency parameters;

further selecting data representative of said first operating parameter in response to a trap lag period being satisfied, said trap lag period comprising a period in which the dependency definition is satisfied; and processing the further selected data by trending to provide an indication of machine performance.

* * * * *